United States Patent [19]

Ray et al.

[11] Patent Number: 4,617,028
[45] Date of Patent: Oct. 14, 1986

[54] AIRCRAFT ENGINE AIR INTAKE INCLUDING A FOREIGN OBJECT SEPARATOR

[75] Inventors: Martin G. Ray, Marblehead; Michael C. Harrold, Lanesville, both of Mass.

[73] Assignee: General Electric Company, Lynn, Mass.

[21] Appl. No.: 548,382

[22] Filed: Nov. 3, 1983

[51] Int. Cl.⁴ ............................................. B01D 45/16
[52] U.S. Cl. ........................................... 55/1; 55/306; 55/394; 55/464; 60/39.092
[58] Field of Search ...................... 55/1, 306, 394, 397, 55/461, 464; 60/39.092; 244/53 B

[56] References Cited

U.S. PATENT DOCUMENTS

| | | | |
|---|---|---|---|
| 619,207 | 2/1899 | Musnicki | 55/394 |
| 2,221,073 | 11/1940 | Bubar | 55/464 X |
| 2,944,731 | 7/1960 | Kastan | 60/39.092 X |
| 3,309,867 | 3/1967 | Ehrich | 55/306 X |
| 3,329,377 | 7/1967 | Peterson et al. | 55/306 X |
| 3,338,049 | 8/1967 | Fernberger | 55/306 X |
| 3,362,155 | 1/1968 | Driscoll | 55/306 X |
| 3,371,471 | 3/1968 | Connors | 55/306 |
| 3,436,910 | 4/1969 | Haworth | 55/306 X |
| 3,465,950 | 9/1969 | Freid et al. | 55/306 |
| 3,521,431 | 7/1970 | Connors et al. | 55/306 |
| 3,616,616 | 11/1971 | Flatt | 55/306 |
| 3,733,814 | 5/1973 | Hull, Jr. et al. | 60/39.092 |
| 3,832,086 | 8/1974 | Hull, Jr. et al. | 55/306 X |
| 4,250,703 | 2/1981 | Norris et al. | 55/306 X |
| 4,268,287 | 5/1981 | Norris | 55/306 |
| 4,456,458 | 6/1984 | Gilbertson | 55/306 |

FOREIGN PATENT DOCUMENTS

| | | | |
|---|---|---|---|
| 368667 | 2/1923 | Fed. Rep. of Germany | 55/397 |
| 422282 | 11/1925 | Fed. Rep. of Germany | 55/397 |

*Primary Examiner*—Kathleen J. Prunner
*Attorney, Agent, or Firm*—Francis L. Conte; Derek P. Lawrence

[57] ABSTRACT

The present invention comprises a method and apparatus for separating foreign objects from airflow channeled to an aircraft engine. An air intake including a foreign object separator is provided. The air intake includes an inlet duct having a bend for defining a pressure side, which inlet duct is effective for channeling airflow to the engine. A separator aperture is disposed in the pressure side of the inlet duct and a receptacle extends from the inlet duct and is in flow communication with the separator aperture. The receptacle includes a turning wall which is substantially arcuate in both a transverse plane and a longitudinal plane, and is substantially closed for preventing the flow of airflow therethrough while being effective for receiving and capturing foreign objects which enter the inlet duct and pass through the separator aperture.

21 Claims, 4 Drawing Figures

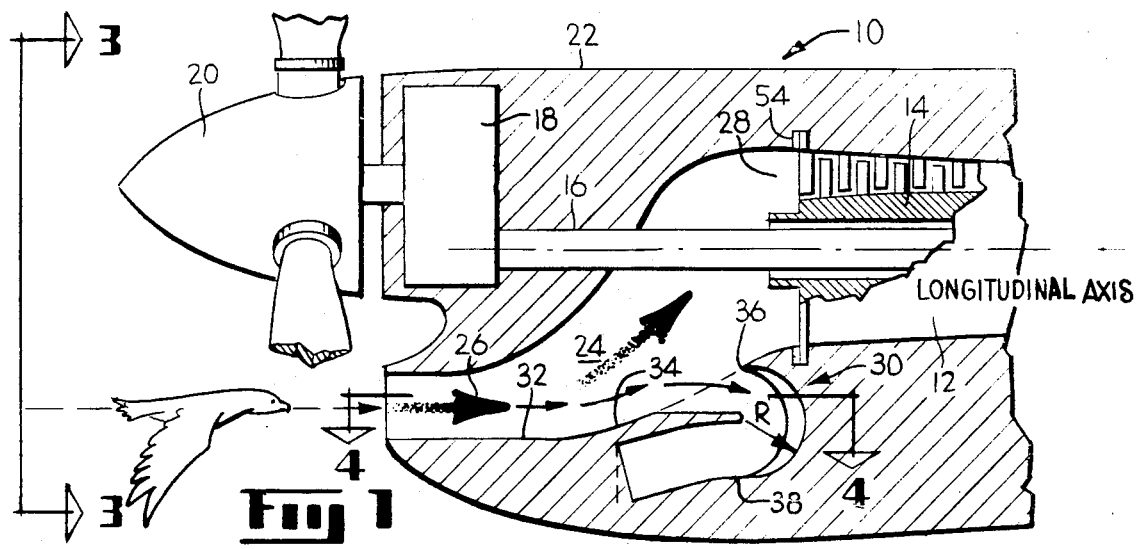
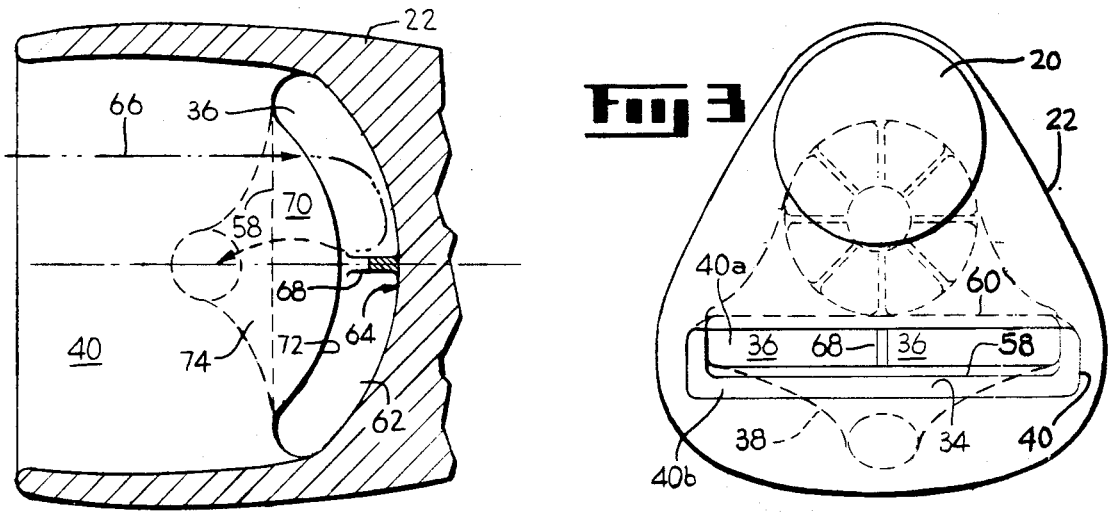
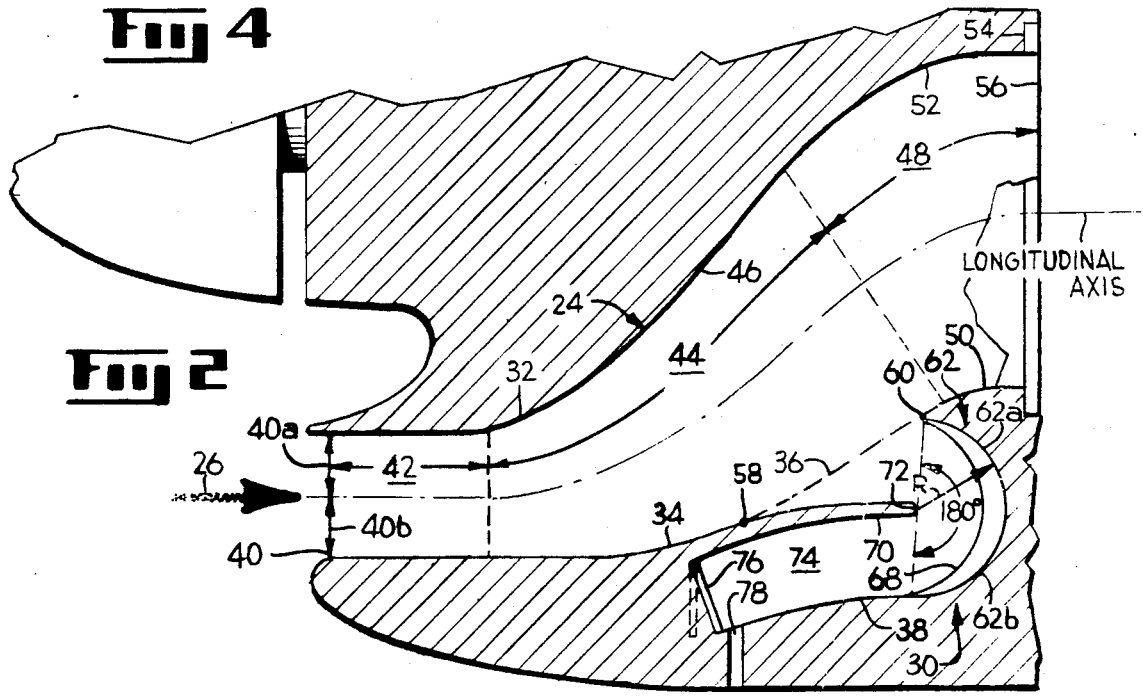

AIRCRAFT ENGINE AIR INTAKE INCLUDING A FOREIGN OBJECT SEPARATOR

BACKGROUND OF THE INVENTION

This invention relates generally to air intakes for aircraft engines, and, more specifically, to an air intake having a foreign object separator for a turboprop engine.

Aircraft gas turbine engines are particularly susceptible to damage from foreign objects introduced into the air inlets of the engines. This problem is significant with respect to relatively large foreign objects such as stones, gravel, birds, hail, ice, and the like, which, when introduced into the engine, can cause instant and substantial damage.

Apparatus are known in the prior art which are effective for removing foreign matter from engine inlet air. These apparatus fall into generally two categories: inlet particle separators effective for removing relatively small particles such as sand, dust and water from the airflow; and those defined herein as foreign object separators which are effective for removing relatively large foreign matter such as those as above described.

Ordinarily, foreign object separators are not effective for providing the protection offered by an inlet particle separator, and vice versa. More specifically, inlet particle separators, on the one hand, are designed for removing relatively small particles for increasing the effective life of the aircraft engine. Foreign object separators, on the other hand, are effective for removing relatively large objects which may be ingested during aircraft takeoff and the first segment of climb wherein substantial damage to the aircraft engine could result in a complete loss of power.

Furthermore, the Federal Aviation Adminstration (FAA) has specified ingestion requirements for turboprop aircraft engines in particular. These requirements include, for example, the ability of an aircraft engine to ingest without substantial loss of engine power, birds defined as being either small, medium, or large and having weights of three ounces, one and one half pounds, and four pounds, respectively. Relatively large foreign objects, for example, medium and large birds will have relatively large inertia when ingested into an aircraft engine upon takeoff or climb and, therefore, require an appropriate foreign object separator to prevent their ingestion into the engine.

Foreign object separators known in the prior art include, for example, sharp bends, screens, and valve structures, all of which result in undesirable pressure losses and increased complexity. Scavenge separators are known which require a portion of freestream inlet air to be channeled or bypassed away from the engine inlet and through the separator for carrying foreign objects overboard. These bypass air separators, therefore, require additional airflow which must be provided by increasing the effective area of the air inlet which results in a reduction of overall operating efficiency. Some of these prior art separators require swirl vanes or valve structures which in of themselves provide obstructions to airflow and which may be damaged by the impact of the these relatively large foreign objects.

SUMMARY OF THE INVENTION

Accordingly, one object of the present invention is to provide a new and improved air intake for an aircraft engine including a foreign object separator.

Another object of the present invention is to provide an improved air intake for more efficiently removing foreign objects from the airflow.

Another object of the present invention is to provide an improved air intake that is effective for reducing the likelihood of reingestion of foreign objects into the air intake.

Another object of the present invention is to provide an improved air intake having a substantially unobstructed flowpath to an engine inlet without causing substantial pressure losses.

Another object of the present invention is to provide an improved air intake which is effective for removing relatively large foreign objects; such as, for example, medium-size birds.

The present invention comprises a method and apparatus for separating foreign objects from airflow channeled to an aircraft engine. According to an exemplary embodiment of the present invention, an air intake including a foreign object separator is provided. The air intake includes an inlet duct having a pressure side, which inlet duct is effective for channeling airflow to the engine. A separator aperture is disposed in the pressure side of the inlet duct and a separator receptacle extends from the inlet duct and is in flow communication with the separator aperture. The separator receptacle includes a turning wall which is substantially arcuate in a transverse plane, and is substantially closed for preventing the flow of airflow therethrough while being effective for receiving and capturing foreign objects which enter the inlet duct and pass through the separator aperture.

According to a preferred embodiment of the present invention, the separator receptacle includes a substantially 180 degree turning wall which extends firstly in a downstream direction from a downstream edge of the separator aperture and secondly in an upstream direction.

A collection chamber extends from the turning wall for capturing any foreign objects which flow downstream through the separator aperture to prevent reingestion thereof into the inlet duct.

BRIEF DESCRIPTION OF THE DRAWINGS

The novel features believed characteristic of the invention are set forth in the appended claims. The invention, itself, together with further objects and advantages thereof is more particularly described in the following detailed description taken in conjunction with the accompanying drawings in which:

FIG. 1 is a longitudinal sectional view of a turboprop engine installation assembly including an air intake according to one embodiment of the present invention.

FIG. 2 is a longitudinal sectional view showing in more detail the air intake illustrated in FIG. 1.

FIG. 3 is a front view of the air intake illustrated in FIG. 1.

FIG. 4 is a top, transverse sectional view of the air intake illustrated in FIG. 1 illustrating in more detail the separator aperture and receptacle.
}

DETAILED DESCRIPTION

For the purposes of this description, longitudinal and transverse planes, views or sections are defined herein as those planes, views or sections illustrated in FIGS. 2 and 4, respectively, which longitudinal and transverse planes, views or sections are oriented 90° with respect to each other.

Illustrated in FIG. 1 is an exemplary aircraft turboprop engine installation 10. The installation 10 includes a conventional gas turbine engine 12 having a longitudinal axis and an axial flow compressor 14. An output shaft 16 of the engine 12 is suitably connected to a reduction gearbox 18, which, in turn, is effective for driving a propeller assembly 20. A nacelle 22 is provided for enclosing the engine 12, output shaft 16 and reduction gear box 18, and includes therein an air intake 24 according to one embodiment of the present invention.

The air intake 24 is effective for channeling freestream airflow 26 to an engine inlet 28 of the turboprop engine 12. The air intake 24 includes a foreign object separator indicated generally at 30 which is effective for removing relatively large foreign objects from the airflow 26 for preventing ingestion thereof into the engine inlet 28.

The air intake 24 also includes an inlet duct 32 having a pressure side 34 which is effective for channeling the airflow 26 to the engine inlet 28 of the engine 12. A separator aperture 36 is disposed in the pressure side 34 of the inlet duct 32 and a separator receptacle, indicated generally as 38, extends from the inlet duct 32 and is in flow communication with the separator aperture 36 for receiving and capturing foreign objects which enter the inlet duct 32 and pass through the separator aperture 36. The separator receptacle 38 is substantially closed, but for the separator aperture 36, for preventing the flow of airflow 26 therethrough.

Illustrated in more particularity in FIG. 2 is the air intake 24 including the foreign object separator 30. The inlet duct 32 has a forward facing inlet aperture 40 which is aligned substantially perpendicularly to the flow direction of the freestream airflow 26, and, in this embodiment, substantially perpendicularly to the longitudinal axis of the engine. The inlet duct 32 may include an optional, substantially straight diffuser portion 42 which is aligned perpendicularly to and in flow communication with the inlet 40.

According to a preferred embodiment of the invention, the inlet duct 32 also includes an intermediate portion 44 in flow communication with the inlet aperture 40. The intermediate portion 44 is preferably curved along its entire axial length and includes a first bend which defines the pressure side 34. The pressure side 34 is generally concave with respect to the interior of the inlet duct 32. An opposite side of the intermediate portion 44 is a generally convex, suction side 46.

It will be appreciated to those skilled in the art that the freestream airflow 26 normally tends to flow in a straight line with respect to the inlet duct 32. However, by providing the first bend immediately downstream of and in line-of-sight with the inlet 40, the airflow 26 is forced to deviate from a straight line, and, therefore, a relative pressure increase is generated as the airflow 26 impinges upon the pressure side 34. Conversely, a pressure decrease is generated at the suction side 46 inasmuch as the airflow 26 tends to separate therefrom.

In the exemplary embodiment illustrated in FIG. 2, the inlet duct 32 also includes a downstream portion 48 in flow communication with the intermediate portion 44. The downstream portion 48 curves to create a second, opposite bend which defines a generally convex suction side 50 and an opposing, generally concave pressure side 52. The suction side 50 extends from and is integral with the pressure side 34 of the intermediate portion 44. At a downstream, flanged end 54 of the downstream portion 48, a rearwardly facing outlet aperture 56 is provided which is substantially perpendicular to the engine longitudinal axis and in flow communication with the engine inlet 28, (as illustrated in FIG. 1).

The intermediate portion 44 and the downstream portion 48 of the inlet duct 32 bend in reverse directions for defining a generally S-shaped inlet duct 32 through which substantially all airflow 26 which enters the inlet aperture 40 is channeled to the engine 12 for providing ram pressurization of the airflow 26. Alternately, the downstream portion 48 may be eliminated and the intermediate portion 44 may be suitably connected to a plenum (not shown) for channeling air to the engine 12.

The separator aperture 36 is defined by an upstream edge 58 and a downstream edge 60 disposed in the intermediate portion 44 of the inlet duct 32. Referring to FIGS. 2 and 3, the alignment of the separator aperture 36 with respect to the inlet aperture 40 will be described. It will be appreciated to those skilled in the art that the airflow 26 flowing through the inlet duct 32 must negotiate the first bend represented by the pressure side 34 of the intermediate portion 44. Inasmuch as the separator receptacle 38 is substantially closed and thus prevents the flow of the airflow 26 therethrough, the airflow 26 can suitably negotiate the first bend of the intermediate portion 44 and flow over the separator aperture 36 without experiencing significant pressure losses, if any.

However, relatively large foreign objects, such as, for example, medium-size birds, which enter the inlet aperture 40, because of their relatively high inertia, will be unable to negotiate the first bend in the intermediate portion 44 and will tend to travel substantially along a straight line. In order to most effectively position the separator aperture 36 for receiving any foreign object which may enter the inlet aperture 40, it has been determined that the separator aperture 36 can simply be aligned in line of sight with only a first portion 40a of the inlet aperture 40.

More specifically, and referring to FIG. 3, the inlet aperture 40 includes the first portion 40a and a second portion 40b. The first portion 40a is disposed outwardly from the pressure side 34 of the inlet duct 32 and the second portion 40b is disposed between the first portion 40a and the pressure side 34. Preferably, the separator aperture 36 extends substantially the full width of the inlet aperture 40, and in particular, the full width of the first portion 40a.

It will be appreciated that inasmuch as the separator aperture 36 is aligned with the radial inwardmost portion 40a of the inlet aperture 40, a foreign object passing in a substantially straight line therethrough will simply pass through the separator aperture 36 aligned therewith. Foreign objects which enter the inlet aperture 40 through the second portion 40b will impinge upon the pressure side 34 and slide toward and into the separator aperture 36. Of course, the size of the separator aperture 36 including its width, and its height as measured between the upstream edge 58 and the downstream edge 60, may be suitably chosen by those skilled in the art to be small enough for reducing any pressure losses due to the inclusion of the aperture 36 and, yet, large enough for allowing the passage of the designed-for foreign objects.

The separator receptacle 38 includes a turning wall 62 having a first portion 62a which extends from the downstream edge 60 in a generally downstream direction and radially outwardly from the longitudinal axis of the engine 12 to a position in generally line-of-sight alignment with the upstream edge 58. The first portion 62a of the turning wall 62 is effective for smoothly directing foreign objects which impinge thereon away from the separator aperture 36 to prevent their reingestion into the inlet duct 32.

FIG. 4 illustrates a transverse section of the foreign object separator 30 and, in particular, illustrates a center portion 64 of the turning wall 62. The turning wall 62 is preferably arcuate and substantially concave in a transverse plane for guiding toward the center portion 64 foreign objects which impinge on the turning wall 62 off center. A path 66 represents the impingement of a foreign object which is directed along the turning wall 62 in a transverse direction toward the center portion 64. This feature is effective, for example, for containing a relatively soft foreign object such as a bird which bursts on impact with the turning wall 62. The turning wall 62 preferably includes a partition 68 which extends outwardly from the center portion 64 for preventing foreign objects from being guided beyond the center portion 64, thus preventing their possible reingestion into the inlet duct 32.

Referring again to FIG. 2, the foreign object separator 30 further includes a lip 70 which extends from the upstream edge 58 in a generally downstream direction substantially parallel to the engine longitudinal axis. The lip 70 includes a tip end 72 which is preferably disposed in a common axial plane and in alignment with the downstream edge 60 of the separator aperture 36. The tip end 72 is spaced from the first portion 62a of the turning wall 62 for providing a passage for foreign objects.

The lip 70 is effective for providing a barrier for reducing the likelihood of, if not for preventing, reingestion of the foreign objects into the inlet duct 32. More specifically, the lip 70 cooperates most effectively with a second portion 62b of the turning wall 62 which extends from the first portion 62a in an upstream direction and spaced from the lip end 72 of the lip 70. The turning wall 62 is curvilinear in profile for smoothly changing the direction of foreign objects passing in a downstream direction through the separator aperture 36 to direct the objects away from the separator aperture 36. In a preferred embodiment, the turning wall 62 is arcuate in profile and extends substantially 180 degrees from the downstream edge 60 and with respect to the tip end 72 of the lip 70.

As illustrated in FIGS. 2 and 4, it will be seen that the turning wall 62 is curvilinear and preferably arcuate in both the illustrated longitudinal and transverse planes and defines a quasi-hemispherical pocket. The lip 70 extends substantially to the center of this pocket and the partition 68 divides the pocket substantially in half. It will be appreciated to those skilled in the art that foreign objects which impinge upon the first portion 62a are smoothly guided around the turning wall 62 for changing the direction thereof to a generally upstream direction as the objects exit the second portion 62b.

This combination of elements and curvature in two planes is particularly effective to smoothly channel relatively soft foreign objects, such as birds, away from the separator aperture 36. This is effective for also substantially containing any burst pieces from being re-ingested into the inlet duct 32. It has been discovered that of most particular importance, the curvature in the transverse plane is most effective for reducing the likelihood of reingestion of burst foreign objects. Without this curvature in the transverse plane, it has been discovered that the foreign object separator 30 is significantly less effective in preventing reingestion. Furthermore, the lip 70 and the partition 68 are provided for increasing the effectiveness of the separator 30 to prevent re-ingestion of foreign objects.

The separator receptacle 38 also includes a collection chamber 74 which extends from the second portion 62b of the turning wall 62 in a generally upstream direction. The collection chamber 74 is effective for receiving and retaining captured foreign objects directed therein by the turning wall 62. The collection chamber 74 includes an access door 76 preferably located at an upstream end thereof, which door is shown in solid line in a closed position during operation. The access door 76 may be suitably opened (shown in dashed line) for removing foreign objects captured in the collection chamber 74.

The collection chamber 74 may also include a drainage aperture 78 located at a suitable low point thereof for draining any fluids such as water which may collect therein. The drainage aperture 78 is sized sufficiently small for preventing any substantial flow of airflow therethrough while still allowing fluid to drain.

Although a particular embodiment of the invention has been disclosed, it will be appreciated to those skilled in the art that this is but one means of effecting a novel method for efficiently separating relatively large foreign objects from airflow channeled to the aircraft engine 12.

More specifically, the method includes the steps of channeling substantially all incoming airflow to the engine 12 through a bend, i.e. the first bend defining the pressure side 34 of the inlet duct 32. The method also includes providing a substantially closed separator receptacle 38 including a turning wall being substantially arcuate in a transverse plane and being in flow communication with a separator aperture 36 disposed in the pressure side 34 of the inlet duct 32 for receiving foreign objects of higher inertia than the airflow 26 which are unable to turn with the airflow 26 channeled through the inlet duct 32.

Additionally, the method may include channeling the airflow 26 from the separator aperture 36 from a downstream to an upstream direction.

Theoretically, it is postulated that inasmuch as substantially all of the airflow 26 is channeled through the inlet duct 32 and not diverted or channeled through the substantially closed separator receptacle 38, the separator receptacle 38 creates an aerodynamic dam of air at the separator aperture 36, thus providing an aerodynamic boundary to the airflow 26 flowing through the inlet duct 32. In this manner, the inlet duct 32 provides a substantially unobstructed flowpath to the engine 12 which, therefore, will experience substantially no pressure losses due to the foreign object separator 30. However, foreign objects having substantial higher inertia than the airflow 26 will simply pass through the separator aperture 36 and into the separator receptacle 38.

While there has been described herein what is considered to be the preferred embodiment of the invention, other modifications will occur to those skilled in the art from the teachings herein and it is desired to secure in the appended claims all such modifications as fall within the true spirit and scope of the invention.

Having thus described the invention, what is claimed as novel and desired to be secured by Letters Patent of the United States is:

1. For an aircraft engine, an air intake comprising:
   an inlet duct having a first bend in a longitudinal plane defining a pressure side and being effective for channeling airflow to said engine, said inlet duct having a separator aperture disposed in said pressure side thereof; and
   a receptacle extending from said inlet duct and being in flow communication with said separator aperture for receiving and capturing foreign objects which enter said inlet duct and pass through said separator aperture, said receptacle being substantially closed for preventing flow of said airflow therethrough and including a turning wall being substantially arcuate in a transverse plane and in said longitudinal plane to define a concave surface facing in an upstream direction, said transverse plane being disposed substantially perpendicularly to said longitudinal plane, for guiding foreign objects away from said separator aperture.

2. An air intake according to claim 1 wherein said inlet duct further includes a forward facing inlet aperture at one end thereof, and an outlet aperture at an opposite end thereof for communicating airflow to said engine, said pressure side being disposed in an intermediate portion of said inlet duct disposed between said inlet and said outlet apertures.

3. An air intake according to claim 2 wherein said inlet duct further includes a downstream portion having a second bend in said longitudinal plane, curving opposite to said first bend, defining a suction side extending from said pressure side of said intermediate portion for defining a generally S-shaped inlet duct for channeling airflow to a compressor of said engine for providing ram pressurization during operation.

4. An air intake according to claim 2 wherein said separator aperture is generally aligned in line of sight with said inlet aperture.

5. An air intake according to claim 2 wherein said inlet aperture includes first and second portions, said second portion being disposed adjacent to said pressure side of said inlet duct and said first portion being disposed away from said pressure side and adjacent to an opposite side of said inlet duct, and said inlet aperture first portion adjacent said opposite side is aligned in line of sight with said separator aperture.

6. An air intake according to claim 1 wherein said separator aperture is defined by upstream and downstream edges of said inlet duct and said turning wall includes a first portion extending from said downstream edge in a generally downstream direction and radially outwardly from said inlet duct to a position spaced downstream from and at substantially the same radial position as said upstream edge.

7. An air intake according to claim 6 wherein said turning wall includes a center portion and is substantially concave in said transverse plane for guiding toward said center portion foreign objects which impinge thereon off-center.

8. An air intake according to claim 7 wherein said turning wall includes a partition extending outwardly from said center portion for preventing foreign objects from being guided beyond said center portion.

9. An air intake according to claim 6 further including a lip extending from said upstream edge in a substantially downstream direction and substantially parallel to the direction of air flowing into said inlet duct, said lip having a tip end disposed in alignment with, and at substantially the same longitudinal position as, said downstream edge of said separator aperture and being spaced from said first portion of said turning wall.

10. An air intake according to claim 9 wherein said turning wall further includes a second portion extending from said first portion in an upstream direction and being spaced from said tip end of said lip.

11. An air intake according to claim 10 wherein said turning wall extends substantially 180 degrees with respect to said tip end of said lip.

12. An air intake according to claim 10 wherein said receptacle further includes a collection chamber extending from said second portion of said turning wall in an upstream direction.

13. An air intake according to claim 12 wherein said collection chamber includes a drainage aperture effective for draining any liquid therein and sized for preventing any substantial flow of airflow therethrough.

14. For an aircraft engine, an air intake comprising:
   an inlet duct having a first bend in a longitudinal plane defining a pressure side and being effective for channeling airflow to said engine, said inlet duct including a forward facing inlet aperrture at one end thereof, said inlet aperture consisting of a first portion and a second portion, said first portion being disposed outwardly from said pressure side and adjacent to an opposite side of said inlet duct and said second portion being disposed between said first portion and said pressure side of said inlet duct;
   said inlet duct further having a separator aperture disposed in said pressure side thereof and being defined by upstream and downstream edges of said inlet duct, said separator aperture extending substantially the full width of said inlet aperture, and said inlet aperture first portion adjacent said opposite side being aligned in line of sight with said separator aperture; and
   a receptacle extending from said inlet duct and being in flow communication with said separator aperture for receiving and capturing foreign objects which enter said inlet duct and pass through said separator aperture, said receptacle being substantially closed for preventing the flow of airflow therethrough and including a turning wall being substantially arcuate in a transverse plane and in said longitudinal plane to define a concave surface facing in an upstream direction, said transverse plane being disposed substantially perpendicularly to said longitudinal plane, for guiding foreign objects away from said separator aperture, and having a first portion extending from said downstream edge in a generally downstream direction and radially outwardly from said inlet duct to a position in alignment with said upstream edge.

15. An air intake according to claim 14 further including a lip extending from said upstream edge of said inlet duct in a substantially downstream direction and substantially parallel to the direction of air flowing into said inlet duct, said lip having a tip end disposed in alignment with said downstream edge of said inlet duct aperture and being spaced from said first portion of said turning wall, said turning wall further including a second portion extending from said first portion in an upstream direction and being spaced from said tip end of said lip.

16. An air intake according to claim 15 wherein said turning wall extends substantially 180 degrees with respect to said tip end of said lip, said turning wall further including a center portion being substantially concave in said transverse plane for guiding toward said center portion foreign objects which impinge thereon off-center.

17. An air intake according to claim 14 wherein said inlet duct further includes a downstream portion having a second bend in said longitudinal plane, curving opposite to said first bend, defining, a suction side extending from said pressure side for defining a generally S-shaped inlet duct for channeling airflow to a compressor of said engine for providing ram pressurization during operation.

18. An air intake according to claim 14 wherein said turning wall defines a pocket and further including a lip extending from said inlet duct to about a center of said pocket.

19. An air intake according to claim 18 further including a collection chamber extending from a portion of said turning wall in a generally upstream direction which is effective for receiving and retaining foreign objects channeled into said collection chamber by said turning wall.

20. A method for separating foreign objects from airflow channeled to an aircraft engine comprising the steps of:
channeling substantially all incoming airflow to said engine through an unobstructed inlet duct having a bend in a longitudinal plane defining a pressure side; and
providing a substantially closed receptacle including a turning wall being substantially arcuate in a transverse plane and in said longitudinal plane to define a concave surface facing in an upstream direction, said transverse plane being disposed substantially perpendicularly to said longitudinal plane, for guiding foreign objects away from said separator aperture, and being in flow communication with a separator aperture disposed in said pressure side of said inlet duct for receiving foreign objects of higher inertia than said airflow which are unable to turn with said airflow channeled through said inlet duct.

21. A method for separating foreign objects from airflow channeled to an aircraft engine according to claim 20 further comprising:
channeling said airflow from said separator aperture from a downstream to an upstream direction.

* * * * *